United States Patent
Wess et al.

(10) Patent No.: US 6,320,669 B1
(45) Date of Patent: Nov. 20, 2001

(54) METHOD AND APPARATUS FOR OBTAINING CONSUMER VIDEO SEGMENTS FOR THE PURPOSE OF CREATING MOTION SEQUENCE CARDS

(75) Inventors: Raymond E. Wess, Holly; John A. Agostinelli, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/057,063

(22) Filed: Apr. 8, 1998

(51) Int. Cl.[7] ............... B41B 15/00; H04N 1/40; G11B 27/02; G11B 5/86
(52) U.S. Cl. .......... 358/1.12; 358/1.11; 358/296; 358/401; 358/450; 360/15; 360/14.3
(58) Field of Search .................. 358/296, 1.12, 358/1.11, 909.1, 311; 360/72.1, 71, 93, 132, 15, 14.3

(56) References Cited

U.S. PATENT DOCUMENTS

| | | | |
|---|---|---|---|
| 5,043,829 | * | 8/1991 | Hahn .................. 360/15 |
| 5,737,087 | * | 4/1998 | Morton et al. .......... 358/296 |
| 5,903,407 | * | 5/1999 | Tsai .................. 360/72.1 |

OTHER PUBLICATIONS

U.S. Ser. No. 08/570,259, Morton et al., filed Apr. 7, 1998.

* cited by examiner

*Primary Examiner*—Edward Coles
*Assistant Examiner*—Twyler Lamb
(74) *Attorney, Agent, or Firm*—William F. Noval

(57) ABSTRACT

A method for obtaining a consumer video segment for the creation of motion sequence cards having a first step of selecting from a consumer's recording media the motion segment that is to be recorded on a motion-sequence card, a second step of recording the selected motion segment on a copy recording media, a third step of marking key frames of the video segments in the selected motion segment with an audio tone, and lastly a forth step of forwarding the selected motion segments recorded on the copy recording media to a motion sequence card fabrication site.

2 Claims, 5 Drawing Sheets

METHOD AND APPARATUS FOR OBTAINING CONSUMER VIDEO SEGMENTS FOR THE PURPOSE OF CREATING MOTION SEQUENCE CARDS

CROSS-REFERENCE TO RELATED APPLICATIONS

The present application is related to U.S. application Ser. No. 08/570,259, filed Dec. 11, 1995, by Roger R. A. Morton, et al., and entitled, "Motion-Based Hard Copy Imaging."

FIELD OF THE INVENTION

The invention relates generally to the process by which a video segment is copied from a customer's video tape to a secondary video tape for the purpose of making a motion sequence card, and to the copy system used.

BACKGROUND OF THE INVENTION

Motion sequence cards are well known and have been available for an extensive period of time. Generally, these cards are mass produced with an identical sequence of images that when viewed in the proper orientation create an illusion of motion. Images used on the card can be animated or a collection of still images captured over a period of time. In addition, traditional motion sequence cards contain well known subject matter and are generally used for advertisement, promotional, or collectable purposes. Motion sequence cards are made by aligning multiple interleaved images behind a linear lens array. Motion can be perceived by viewing the card while tilting it around an axis parallel to the lenticules.

Historically, motion sequence cards have been mass produced with a single sequence of images due in part to the difficulty of selecting a proper sequence of images for the motion sequence card. It is desirable to provide a method to produce individual custom motion sequence cards from any video source including VHS and 8mm video tape in a low cost and effective manner.

It is also desirable to minimize the cost of the system for capturing a motion sequence by enabling a capture only system at the retail location. A printer at a hub location would fulfill the sequences captured at the retail location.

U.S. application Ser. No, 081570,259, filed Dec. 11, 1995, by Roger R. A. Morton, et al., and entitled, "Motion-Based Hard Copy Imaging" discloses a motion based hard copy imaging system that incorporates an apparatus for selecting, storing, and viewing a series of views from video. The apparatus incorporates a programmed processor.

SUMMARY OF THE INVENTION

The present invention is directed to overcoming one or more of the problems set forth above. Briefly summarized, according to one aspect of the present invention a method for obtaining a consumer video segment for the creation of motion sequence cards, comprising the steps of:

a) selecting from a consumer's recording media the motion segment that is to be recorded on a motion-sequence card;
b) recording the selected motion segment on a copy recording media;
c) marking key frames of the video segments in the selected motion segment; and
d) forwarding the selected motion segments recorded on the copy recording media to a motion sequence card fabrication site.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention addresses the problem of obtaining a sequence of images from a consumer's home video tape and describes a low cost method for recording a segment of video for the purpose of creating a personalized motion sequence card.

BRIEF DESCRIPTION OF THE DRAWINGS

To facilitate the understanding of the present invention, identical reference numerals have been used in the drawings and in the description of the invention, where possible, to designate identical elements.

DETAILED DESCRIPTION OF THE INVENTION

Figure 1:
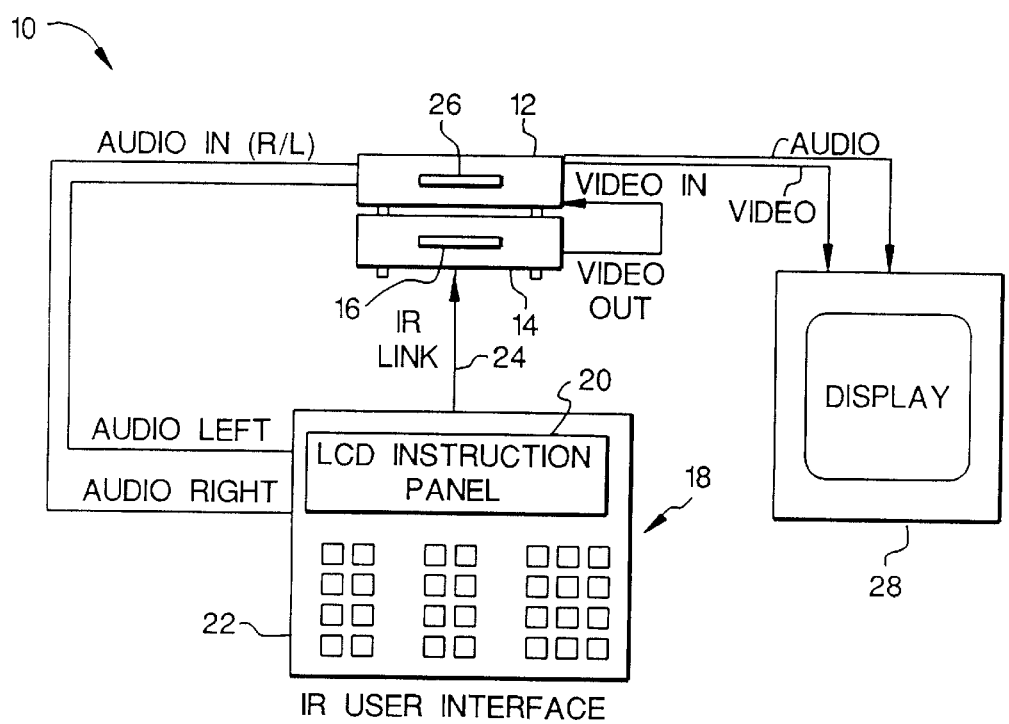
FIG. 1 is a block diagram illustrating an interconnection of a pair of video tape players and a control panel with an infrared control interface and an audio tone generator for selective transference of a video sequence.

FIG. 1 depicts a system 10 that automatically copies a segment of video from an input video tape 16 to a second (copy) video tape 26 for the purpose of creating a motion sequence card. The system consists of two VCRs, 12 and 14, a video edit controller 18, which includes an LCD display 20 and a monitor 28 for viewing the video. The system 10 requires a trained operator at both the retail collection location and the hub printing location. In this scenario, the retailer copies a five second video segment from the customer's input video tape 16 to the copy video tape 26 based on the customer's direction. After the video segment is recorded, a secondary operation is performed consisting of adding an audio tone to the recorded video segment for the purpose of identifying the key video frames within the segment. The key frame may be the first, last, or intermediate frame. There also may be multiple tones to distinguish key frame types. This procedure insures that the customer receives a motion sequence card with the correct scene content. Once the customer's segment has been recorded and marked, the copy tape 26 is sent to a fulfillment printing location where a motion card is fabricated. The fabrication of the motion card from a sequence of image frames is a known manufacturing technique that is not part of the present invention.

The copy tape 26 can contain several hundred customer video segments. At the printing location a trained technician selects a number of video frames from the customer's five second video segment using a video digitizer. With the selection completed, the sequence is printed on a lenticular base coated with a photosensitive material and processed. Alternatively, a thermal dye sublimation process can be used to produce the lenticular image. The image is then delivered to the customer.

The video edit controller 18 is comprised of a keyboard 22, an LCD display 20, audio tone outputs, and an infrared output 24 that links the controller to the two VCRs for the purpose of copying a video segment from the customer's video tape 16 to the copy video tape 26. The input VCR 14 accepts the customer's video tape containing prerecorded information from which a motion sequence card is derived. The copy VCR 12 is a high end consumer or professional grade VCR having the ability to record on the audio track independent of recording on the video track. In this system, it is understood that the infrared codes for the purpose of controlling the VCRs are unique to each VCR. The keys 22 on the video edit controller 18 emulate standard IR remote functions and include, but are not limited to pause, play, frame advance, frame reverse, fast forward, and rewind. The keys 22 on the video edit controller 18 also provide a means for entering customer tracking information such as a customer order number and retailer code. The LCD display 20 on the video edit controller provides message prompts to the user to guide the video dubbing process. The video edit controller 18 has two audio outputs which are connected to the audio inputs of the copy VCR 12. The video out of the input VCR 14 is connected to the video input of the copy VCR 12, and the video out and audio out of the copy VCR 12 is connected to a display (monitor) 28. The display 28 is necessary to allow viewing of the video segments before, during, and after the video sequence is copied.

When a customer brings a video tape to the dubbing station at a retail location, the tape is inserted into the VCR 14. A copy video tape 26 which collects video segments is placed in the VCR 12. The customer's tape is queued to the video segment for the motion sequence card by using the VCR 14 control keys 22 on the video edit controller 18. A copy key on the video edit controller 18 is pressed once the desired video sequence has been identified and located on the input video tape 16. When the copy key is pressed, the video edit controller 18 automatically sequences the proper commands to the two VCRs which results in copying approximately five seconds of video from the input video tape 16 to the copy video tape 26. When the copy sequence is complete, the customer identifies the key frame within the copied sequence by adding an audio tone to the left audio channel on the copy video tape 26. The tone is added at the moment the key frame appears on the monitor 28 by pressing a key on the video edit controller 18. The tone is sent to the left input channel from a tone generator within the video edit controller 18. Alternative key frame marking techniques may be used, for example, a separate control track or adding information to the vertical blanking interval. This process can be repeated until the customer is satisfied with the selection of the key video frame. In addition to adding a tone on the left channel for key frame identification, order information for tracking the customer's order is added to the right channel through a series of audio tones. Order information such as retailer code, auto sequencing job number, and order information is automatically added by the video edit controller 18.

Figure 2:
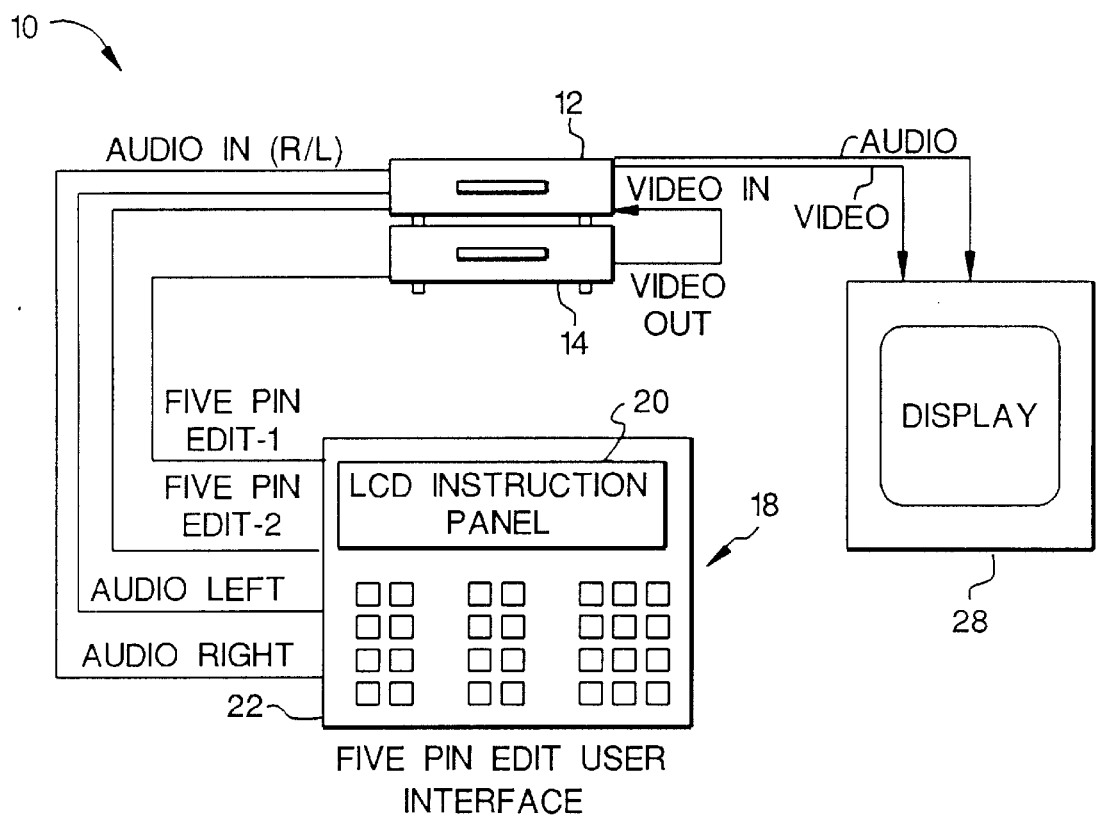
FIG. 2 is a block diagram illustrating an interconnection of a pair of video tape players and a control panel with a standard edit control interface and an audio tone generator for selective transference of a video sequence.

Alternatively, in FIG. 2 the video edit controller 18 could have a five pin edit control interface or an RS232 interface, or the like common to high-end consumer and professional VCRs. The control interface would replace the IR interface and provide precision control of both VCRs. The work flow and key press sequence is common to both methods.

The final copied video segment contains about 150 frames of video, an audio tone for identifying the key video frame, and customer/retail order information. The copy video tape 26 is sent to a printing fulfillment center where the video segment is digitized and the key frame is identified using the tone on the video tape added by the customer. The video segment is exposed on a motion sequence card and processed. The customer order information provided on the copy video tape 26 through a series of tones is decoded and used to route the motion sequence card back to the customer.

Figure 3A:
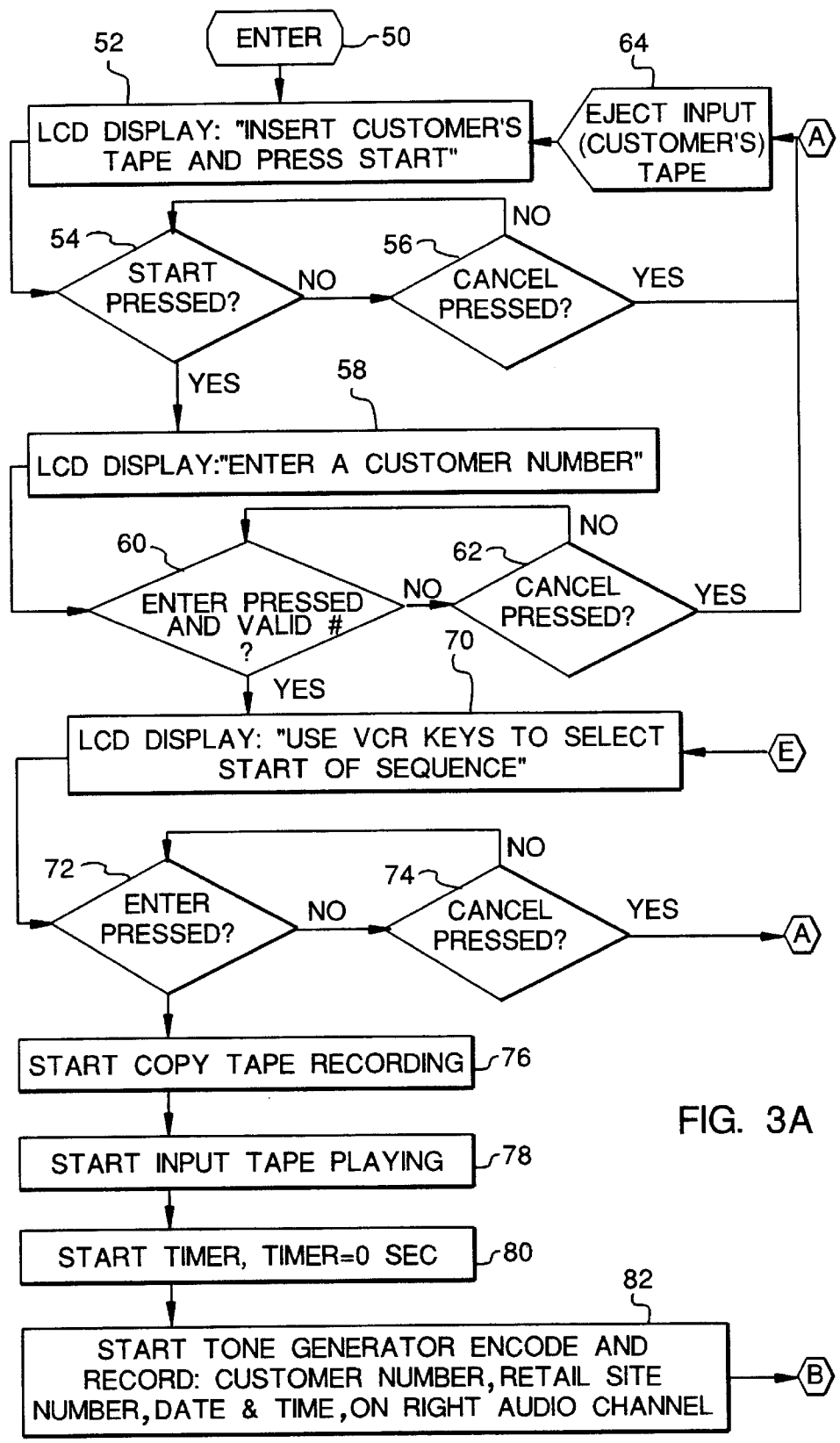
FIGS. 3A, 3B, and 3C illustrate in flow chart form the process of operation of the present invention.
Figure 3B:
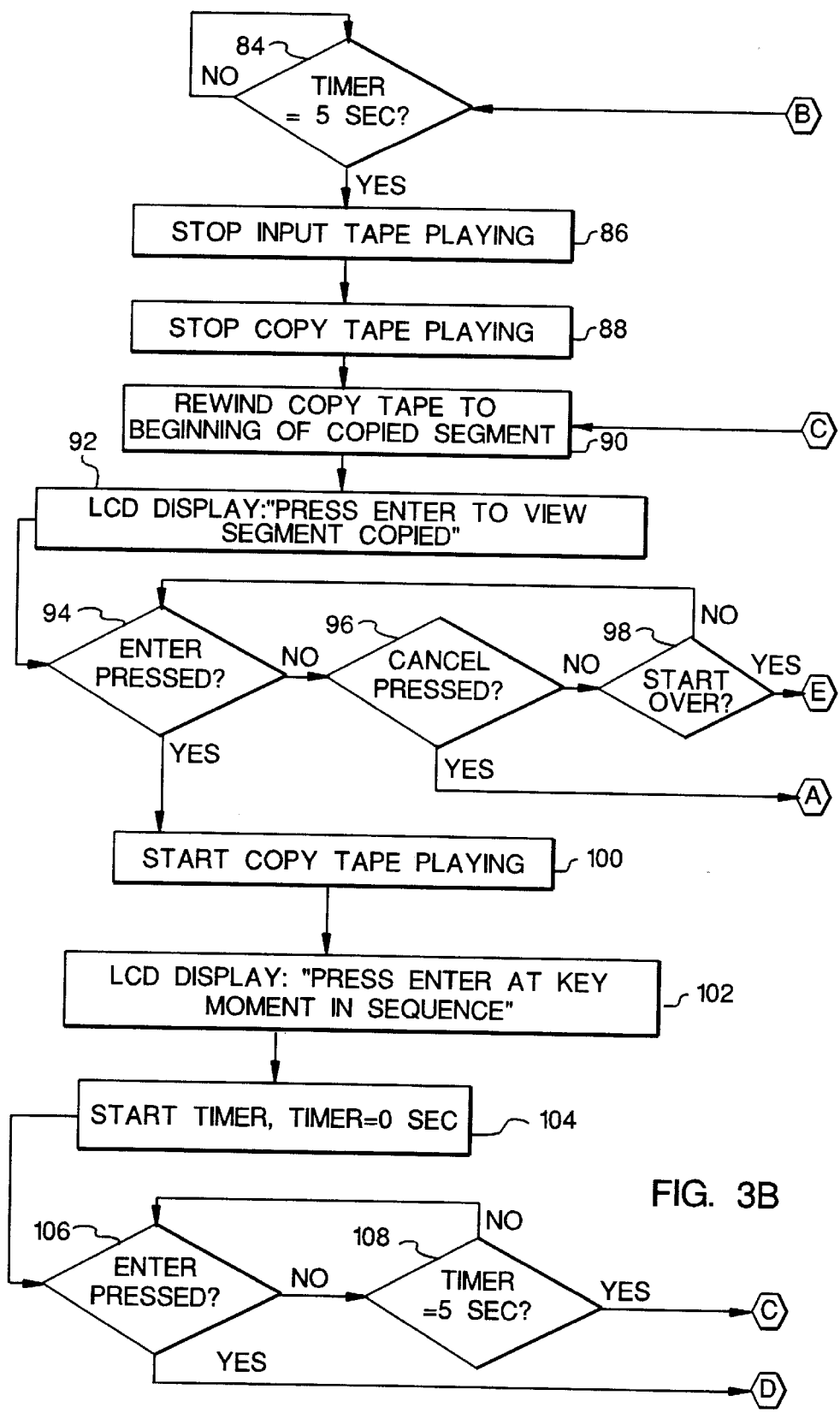
Figure 3C:
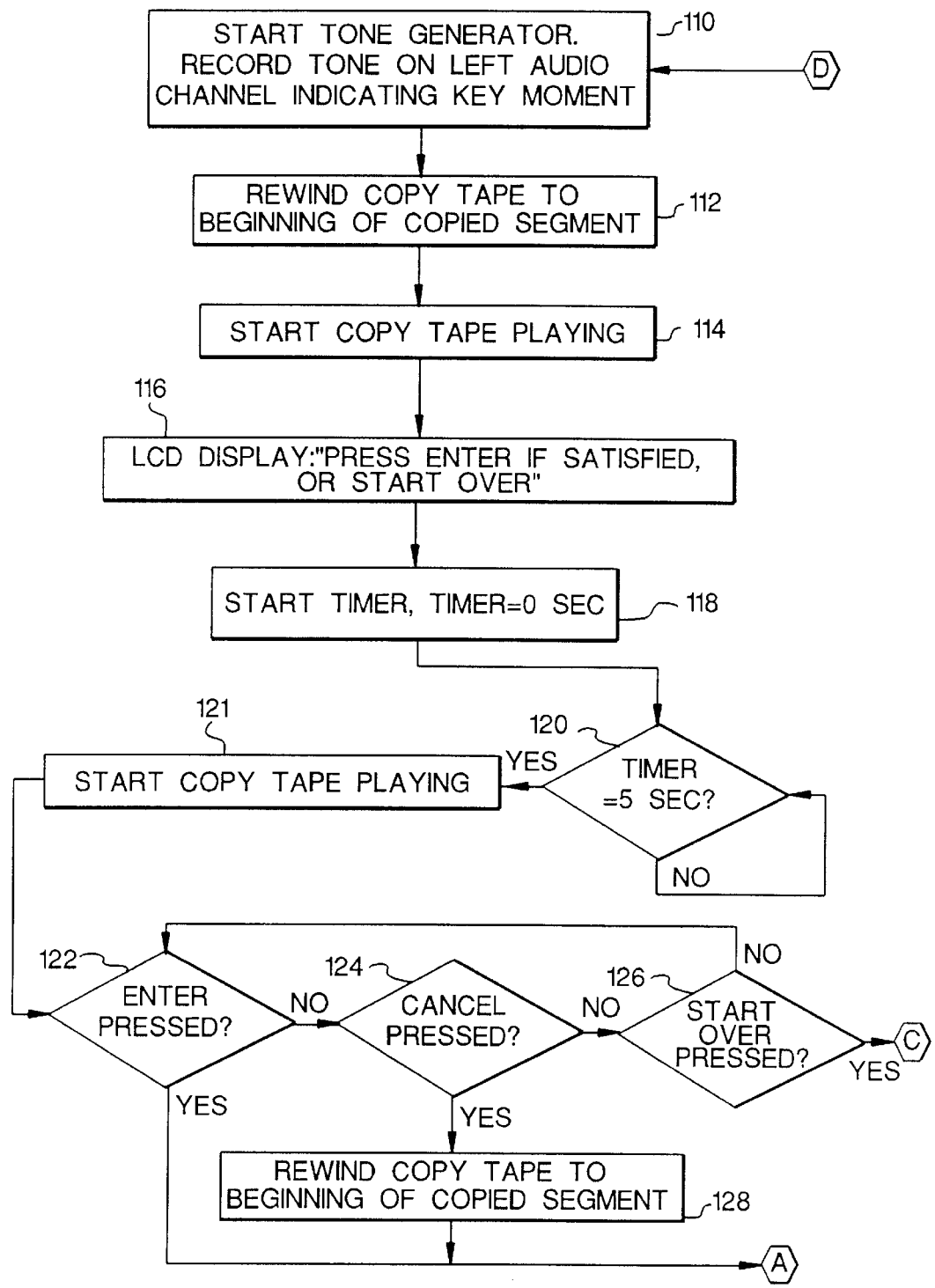

Referring to the detailed flow chart of FIGS. 3A through 3C, the process starts with an enter block 50 which causes a message 52 to be displayed requesting that the customer insert the tape into the tape reader and to also press a Start button. The process questions whether the Start button has been pressed in block 54 and if so the display displays the message 58 requesting the entry of a customer number. If the Start button has not been pressed a query 56 is made as to whether the Cancel button has been pressed. If the answer is "No" a loop back to block 54 is made awaiting a yes or a no from block 54. If the answer is a "Yes" then the process routes to block 64 to cause the customer's tape to be ejected from the system. The operator of the system 10 enters the customer number and a query per block 60 is made as to the accuracy of the entered number. If the number is valid the process advances to display the message 70 that requests the selection of the start sequence representing the position of the starting frame of the sequence that is to contain the motion sequence to be recorded onto the motion card. If the number is not valid the process queries in block 62 whether to continue or to eject the tape and to end the transaction. Entering a starting frame satisfies the query of block 72 and the copy tape recording sequence is started, per block 76. If the starting frame is not selected, the process loops in block 74 to either eject the customer's tape or to continue to wait for the selection entry to be made. When the copy video tape 26 is placed in the recording mode the input video tape 16 is placed into the play mode, per block 78 and a start timer is set to 0 seconds, per block 80. Simultaneously, a tone generator, per block 82, is activated and the customer's data such as the customer's number, retail site, date, and time, is recorded on the right audio channel of the tape recorder. FIG. 3A transitions to FIG. 3B via the hexagonal-shaped box labeled B. The process continues with block 84 querying whether 5 seconds has transpired or not. If so, the input video tape 16 is stopped, per block 86, and the copy video tape 26 is also stopped, per block 88. Next the copy video tape 26 is rewound per block 90 to the beginning of the copied segment and a "Press Enter To View Segment Copied" message 92 is displayed to the operator. When the Enter button is pressed per 94, the Start Copy Tape Playing 100 is performed. If the Enter button is not pressed, a query 96 is made as to the Cancel button being pressed. If the Cancel button has not been pressed, a closed loop 98 start over is either commenced or not commenced based on the operator's selection. If the Cancel button has been pressed, the program loops back per hexagonal block A in FIG. 3B to the hexagon block A at the input of the eject function 64 shown in FIG. 3A. With the copy tape playing per block 100, the display requests a "Press Enter at Key Moment in Sequence" per block 102. The key moment has been identified by the audio tone recorded on the copy tape. When the Enter key is pressed, a timer is set to zero seconds per block 104 and an enter query is performed per function block 106. If the Enter key is not energized, a timer per block 108 which was set to zero seconds upcounts towards 5 seconds at which time a query is directed back to block 106 to question whether an Enter has occurred. This query continues until the timer tops out and/or there is an Enter and/or the Enter key is struck. If the Enter key is depressed, the process moves per the hexagonal block labeled D to FIG. 3C and the input to block 110 which starts a tone generator that causes the recording of a tone on the left audio channel of the copy VCR. Thereafter per block 112, the copy tape is rewound to the beginning of the copied segment. Next, per block 114, the copy tape playing is started to allow the customer to review the key moment (tone). At that time the display displays the "Press Enter If Satisfied, Or Start Over" message 116. Simultaneously the start timer is set to zero seconds per block 118 and the timer either times out in 5 seconds per block 120 and/or loops back onto itself until 5 seconds is reached. At the end of the 5 second period the copy tape is stopped per block 121, and the process questions whether the Enter button has been pressed per block 122. If it has, the process advances to the hexagonal block labeled A in FIG. 3A and the customer's tape is ejected per function block 64. If the Enter key is not pressed the process advances to block 124 which queries whether the Cancel key has been pressed. If the answer to that query is yes, the process advances to rewind the copy tape to the beginning of the copy segment per block 128. If the Cancel button has not been pressed, a query is made per block 126 whether the Start Over button has been pressed. If the answer is no, the process loops back to block 122 to query if the enter has been pressed. If the Start Over button has been pressed, the program advances to hexagonal block labeled C and to the like-labeled block on FIG. 3B which is input to the rewind copy tape to the beginning of the copied segment block 90.

The invention has been described with reference to a preferred embodiment; However, it will be appreciated that variations and modifications can be effected by a person of ordinary skill in the art without departing from the scope of the invention.

PARTS LIST:

10 system
12 copy VCR
14 input VCR
16 input video tape
18 video edit controller
20 LCD display
22 keyboard
24 infrared output
26 copy video tape
28 monitor (display)
50 enter
52 display message
54 question
56 query
58 display message
60 query
62 query
64 ejection
70 display message
72 query
74 loop
76 start copy tape recording
78 recording and play mode
80 timer is set
82 tone generator activated
84 query
86 stop input video tape
88 stop copy video tape
90 rewind
92 press enter to view segment copied
94 enter
96 query
98 closed loop start over
100 start copy tape playing
102 press enter display
104 set timer
106 enter query
108 timer begins
110 tone generator begins
112 rewind copy tape
114 stop copy tape playing
116 press enter if satisfied or start over message
118 start timer
120 timer times out or loops back
121 stop copy tape playing
122 enter query
124 cancel query
126 start over query
128 rewind copy tape

What is claimed is:

1. Method for obtaining a consumer video segment for the creation of motion sequence cards, comprising the steps of:
   a) selecting from a consumer's recording media the motion segment that is to be recorded on a motion-sequence card;
   b) recording the selected motion segment on a copy recording media;
   c) marking key frames of the video segments in the selected motion segment; and
   d) forwarding the selected motion segments recorded on the copy recording media to a motion sequence card fabrication site wherein said copy video tape has another audio channel and including the steps of recording relevant customer or retailer information in said another audio channel.

2. Apparatus for enabling the formation of a motion sequence card from consumer provided video tapes, comprising:
   a first VCR for receiving a consumer provided video tape;
   a second VCR connected to said first VCR for receiving and recording selected video segments from the video tape provided to said first VCR and key frame marks from a video edit controller;
   video edit controller means connected to said first and to said second VCR for enabling selection of a sequence of motion frames from the selected video segments recorded by said second VCR to facilitate the formation of a motion sequence card with the selected sequence of motion frames; and
   means for displaying the video received by said first and said second VCR to facilitate user selection through said control means wherein copy video tape has two audio channels, one channel for recording key frame audio signals and the other channel for recording relevant customer or retailer information.

* * * * *